United States Patent [19]

Peotter et al.

[11] Patent Number: 5,599,470
[45] Date of Patent: Feb. 4, 1997

[54] BATTERY BOX FOR ENGINE DRIVEN WELDER

[75] Inventors: Benjamin G. Peotter, Kaukauna; Harvey R. Johnson, Appleton, both of Wis.

[73] Assignee: Miller Electric Manufacturing Company, Appleton, Wis.

[21] Appl. No.: 526,494

[22] Filed: Sep. 11, 1995

[51] Int. Cl.$^6$ ............................................. B23K 9/10
[52] U.S. Cl. ............................ 219/133; 310/89; 361/727
[58] Field of Search .................................... 219/133, 134; 290/1 A, 16, 27, 28, 50; 361/608, 622, 641, 724, 725, 727; 310/89

[56] References Cited

U.S. PATENT DOCUMENTS

| | | | |
|---|---|---|---|
| 3,289,044 | 11/1966 | Ginsberg | 361/727 |
| 3,717,805 | 2/1973 | Gnaedinger et al. | 361/608 |
| 4,939,622 | 7/1990 | Weiss et al. | 361/727 |

OTHER PUBLICATIONS

Miller Welders catalog excerpt, "Big 40", NWSA:320, Mar. 1970.

*Primary Examiner*—Clifford C. Shaw
*Attorney, Agent, or Firm*—Mark W. Croll; Thomas W. Buckman; John P. O'Brien

[57] ABSTRACT

A battery box for an engine driven welding machine slides in an opening in the welding machine base between closed and open positions. When the battery box is in the closed position, a battery secured to a battery box is concealed inside the base. When the battery box is in the open position, the battery is exposed for servicing. Panels assembled to the base define an opening in the base. The panels cooperate with the base floor to form slots in which the battery box slides. The panels and base floor provide a cantilever support for the battery box when it is in the open position. A finger hole in the battery box is surrounded on one side by a small housing that keeps foreign material out of the machine base when the battery box is in the closed position.

8 Claims, 3 Drawing Sheets

BATTERY BOX FOR ENGINE DRIVEN WELDER

BACKGROUND OF THE INVENTION

1. Field of the Invention

This invention pertains to welding machines, and more particularly to batteries for welding machine engines.

2. Description of the Prior Art

Internal combustion engines, both gasoline and diesel, are integral parts of self-contained welding machines. To start the engine at the beginning of a welding job, an electric storage battery is included in the welding machine. The battery is suitably wired to the engine and its controls in well known manner.

The placement of the battery in a welding machine poses a problem. Since welding machines are often used under dirty and rough conditions, it is highly desirable that the battery be protected. On the other hand, the battery must be easily accessible for servicing and replacement.

In some prior welding machines, the battery was fastened to the horizontal wall of an L-shaped bracket. The bracket was manually slideable on a floor of the machine base between a closed location and an open location. When the bracket was in its closed location, the battery was safely protected in a compartment in the machine base, and a bracket vertical wall closed the compartment. When the bracket was in its open location, the battery was exposed outside of the machine base.

The base contained a pair of slots that guided the battery bracket. However, prior attempts to create the slots required expensive fabrication, such as welded channels.

Another disadvantage of the prior design was that the bracket could be pulled completely out of the base. When that happened, the bracket and battery fell from the base onto the floor. Damage to the battery was a likely probability, and injury to a person's toes was also possible.

Another prior battery storage design employed a plate that was hinged to the machine base. That design prevented the battery and its mounting from falling when the plate was opened to expose the battery. However, the hinged battery plate was undesirably complicated and expensive.

Other prior attempts to solve the battery storage problem have also been only marginally successful.

SUMMARY OF THE INVENTION

In accordance with the present invention, a battery box for an engine driven welding machine is provided that both safely conceals and exposes an electric storage battery within the machine. This is accomplished by securing the battery to a slideable carrier that is cantilever mounted in the welding machine base.

The welding machine base has a floor with sides upstanding therefrom. One side of the base is partially closed by two panels, each being bent into a generally J-shaped cross section. Each panel has an outside leg, a middle leg, and an inside leg. The panels are assembled symmetrically to the base floor and adjacent side such that the panel outer legs are coplanar and form a vertical surface of the base. The middle walls of the panels define an opening in the base vertical surface. Both panels are notched near the base floor. The notches are simply cut from the bent legs of the panels and require no fabrication. The notched portions of the panels cooperate with the base floor to form a narrow horizontal slot on each side of the vertical surface opening.

The battery box carrier is L-shaped, being simply made of one piece of material bent into a horizontal plate and vertical plate. The battery rests on the carrier horizontal plate, which in turn rests on the floor of the welding machine base. Opposed side edges of the carrier horizontal plate lie within the associated slots formed by the notched panels and the base floor.

The battery box is slideable horizontally on the base floor between a closed position and an open position. When the battery box is in the closed position, the battery is inside the welding machine base, and the carrier vertical plate closes the opening in the base vertical surface. When the battery box is in the open position, the carrier is cantilever supported within the slots in the base panels, and the battery is exposed outside of the base. Tabs on the back end of the carrier horizontal plate contact the inside legs of the base panels to prevent the battery box from being pulled completely out of the base.

To secure the battery to the battery box, a bracket is joined to the carrier. The bracket has a channel section that guides the battery on the carrier horizontal plate. A strap extends along an edge of the battery. J-hooks and nuts connect the strap to the bracket channel section.

To provide ease of pulling the battery box to its open position, the carrier horizontal plate is formed with a finger hole. There also is an associated cutout in the base floor. A housing section of the battery box bracket surrounds the carrier finger hole next to the bracket channel section. The bracket housing section assures that no foreign materials can enter the base interior through the carrier and base floor cutouts when the battery box is in its closed position.

The method and apparatus of the invention, using a battery box with a cantilevered carrier, thus enables a welding machine battery to be readily exposed or concealed. The probability of injury to personnel or of damage to the battery are remote, even when the battery box is slid to its fully open position.

Other advantages, benefits, and features of the present invention will become apparent to those skilled in the art upon reading the detailed description of the invention.

DETAILED DESCRIPTION OF THE PREFERRED EMBODIMENT

Although the disclosure hereof is detailed and exact to enable those skilled in the art to practice the invention, the physical embodiments herein disclosed merely exemplify the invention, which may be embodied in other specific structure. The scope of the invention is defined in the claims appended hereto.

Figure 1:
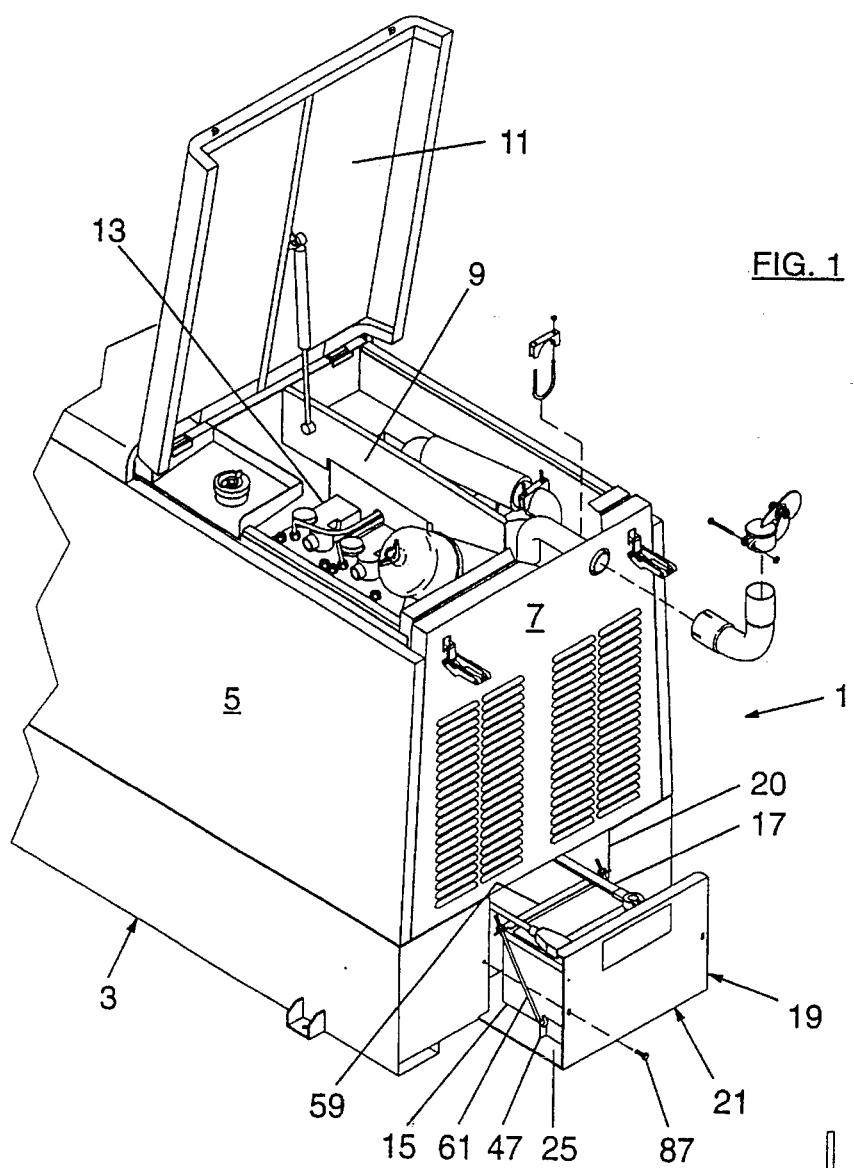
FIG. 1 is a perspective view of the battery box of the invention installed in the base of a welding machine.

Referring to FIG. 1, a portion of an engine driven welding machine 1 is illustrated that includes the present invention. The particular welding machine 1 shown has a base 3 and side covers 5 that upstand from the base. An end cover 7 cooperates with the side covers 5 to form an engine compartment 9. A top cover 11 is closeable over the engine compartment 9. An internal combustion engine 13, which may be gasoline or diesel, is mounted in the engine compartment. The engine 13 and its controls, not shown but well known in the art, are supplied with electrical power from a storage battery 15. Wires 17 lead from the battery 15 to the engine and its controls.

Figures 4, 5:
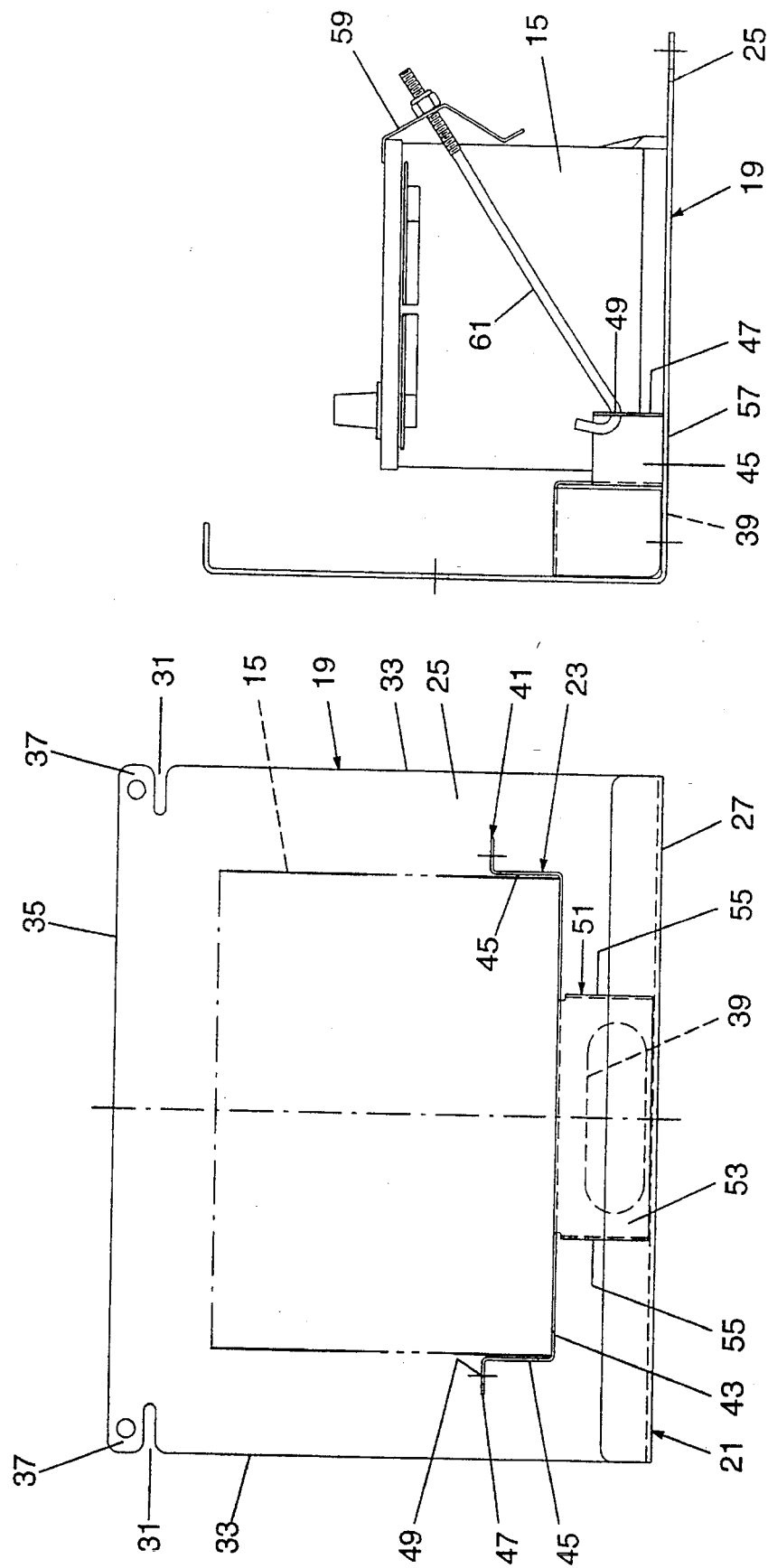
FIG. 4 is a top view of the battery box.
FIG. 5 is a side view of the battery box.

In accordance with the present invention, the battery 15 is secured to a battery box 19 that is cantilever mounted in an opening 20 in the base 3. Looking also at FIGS. 2, 4, and 5, the battery box 19 is comprised of a carrier 21 and a bracket 23. The carrier 21 is fabricated from a single piece of sheet metal and consists of a horizontal plate 25, a vertical plate 27, and an overhanging top lip 29. Each of these portions is simply formed by bending the single sheet. There is a notch 31 in each side edge 33 of the horizontal plate 25 near the back edge 35 thereof, thus forming a pair of tabs 37. The carrier horizontal plate also defines a finger hole 39 through it near the vertical plate 27.

The battery box bracket 23 has two sections. The first section 41 is channel shaped when viewed from the top, having a front leg 43 and two side legs 45. The side legs 45 terminate in respective outturned flanges 47. There is a hole 49 through each flange 47.

The second section of the bracket 23 is a small housing 51 that covers the finger hole 39 in the carrier horizontal plate 25. For that purpose, the housing 51 has a top wall 53 that extends from the channel section middle leg 43 to the carrier vertical plate 27. Two side walls 55 of the bracket housing section extend between the channel section middle leg, the housing section top wall 53, and the carrier horizontal and vertical plates 25 and 27, respectively. In that manner, access to the finger hole 39 in the carrier horizontal plate is possible only through the bottom side 57 of the carrier horizontal plate.

The battery 15 is secured to the battery box 19 by placing the battery on the carrier horizontal plate 25. The distance between the bracket channel section inside legs 45 is such that they loosely fit against the sides of the battery. A strap 59 is placed against an upper edge of the battery. J-hooks and nuts 61 engage the holes 49 in the bracket flanges 47 to secure the battery firmly to the battery box.

Figure 3:
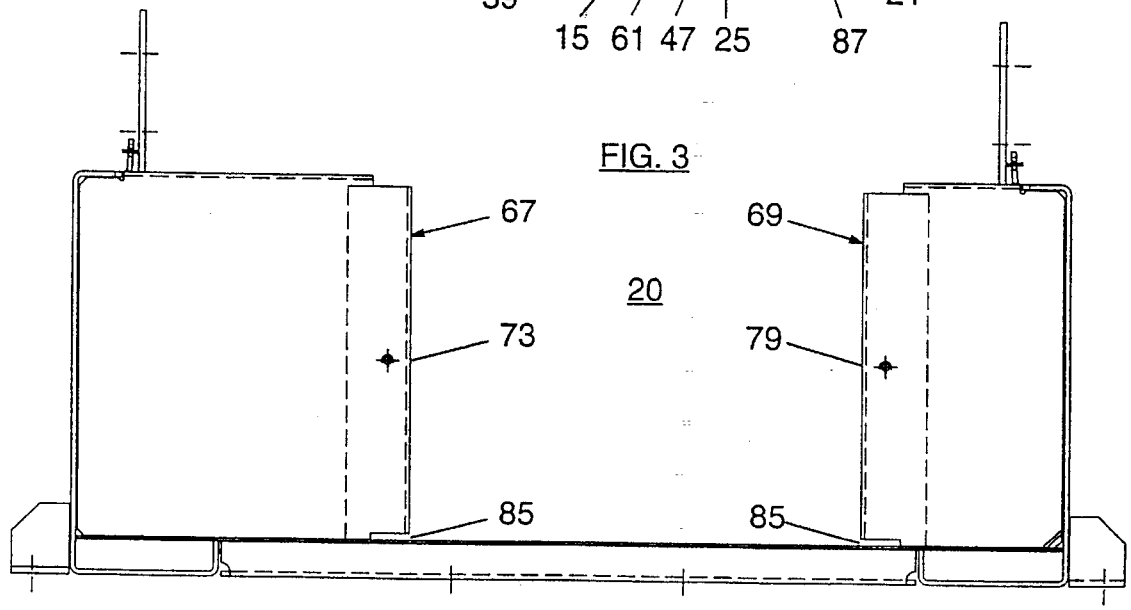
FIG. 3 is an end view of the base of the welding machine showing the opening in which the battery box is installed.
Figure 2:
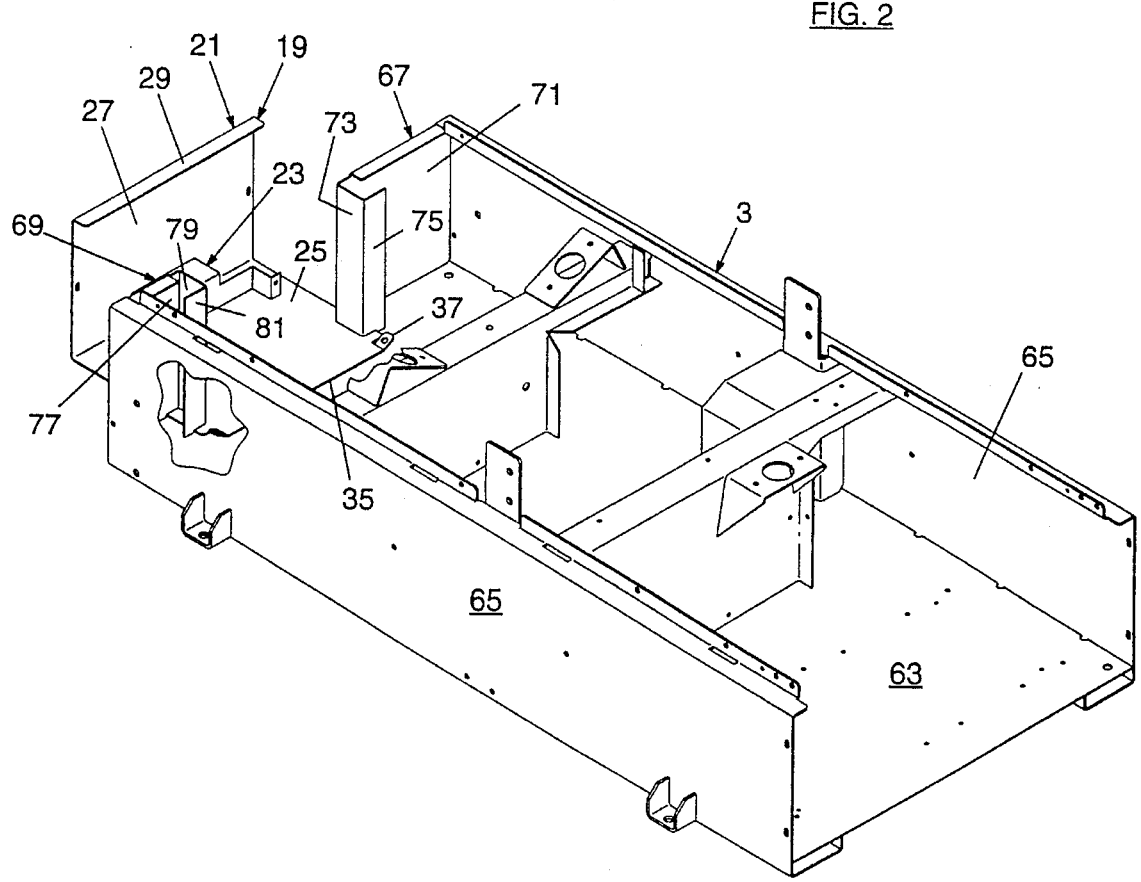
FIG. 2 is a perspective view of the base of the welding machine of FIG. 1, showing the battery box in an open position.

It is a feature of the present invention that the battery box 19 is safely and easily slideable within the opening 20 in the welding machine base 3. As best shown in FIGS. 2 and 3, the base has a floor 63 and side panels 65 that upstand from the floor. A pair of generally J-shaped end panels 67 and 69 partially close one end of the base. The end panel 67 has a relatively long outside leg 71, a middle leg 73 at right angles to the outside leg, and a relatively short inside leg 75 parallel to the outside leg. Similarly, the end panel 69 has a relatively long outside leg 77, a middle leg 79, and a relatively short inside leg 81. The two end panels are assembled to the base with their outside legs 71 and 77 coplanar so as to form an end surface of the base. The middle legs 73 and 79 of the end panels define the opening 20 in the base end surface.

The middle legs 73 and 79 of the end panels 67 and 69, respectively, are slightly shorter than the outside legs 71, 77 and inside legs 75, 81. The outside and inside legs are notched at the base floor. The result is a horizontal slot 85 in each end panel adjacent the base floor 63 and adjacent the opening 20. The slots 85 are thus created merely by bending and notching the end panels. Although the preferred embodiment is shown in conjunction with a base end panel, it should be appreciated that the horizontal slots 85 could be made in a base side wall by properly bending and cutting middle and inside legs of appropriate panels.

The back edge 35 of the battery box carrier 21 is slid into the slots 85 in the base end panels 67 and 69. The tabs 37 are bent up at approximately a 45 degree angle. The battery box 19 is thus captured within the base 3.

The battery box 19 can be slid to a closed position whereat the carrier vertical plate 27 contacts and overlies the outside legs 71 and 77 of the end panels 67 and 69, respectively. Screws 87 are used to fasten the vertical plate to the end panels. When the battery box is in the closed position, the battery 15 is concealed and protected inside the base 3. The bracket housing section 51 prevents animals and debris from entering the base through the finger hole 39 when the battery box is in the closed position.

To obtain access to the battery 15 servicing or replacement, a person removes the screws 87. He inserts his fingers into the hole 39 in the battery box carrier 21 and pulls the battery box 19 to an open position. The tabs 37 prevent the battery box from being pulled completely out of the base 3. The distance between the outside legs 71, 77 and the inside legs 75, 81 of the end panels 67, 69, respectively, provide a horizontal cantilever support for the battery box horizontal plate 25. Consequently, the battery box is stably and safely supported in its open position by the cooperation of the end panels and the base floor 63.

Thus, it is apparent that there has been provided, in accordance with the invention, a battery box for an engine driven welder that fully satisfies the aims and advantages set forth above. While the invention has been described in conjunction with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims.

We claim:

1. An engine driven welding machine comprising:
    a. a base having a floor;
    b. means mounted in the base for producing welding power;
    c. battery box means for sliding horizontally within the base between open and closed positions;
    d. an electrical storage battery secured to the battery box means, the battery being exposed outside of the base when the battery box means is in the open position and being concealed inside the base when the battery box means is in the closed position, the battery box means further comprising:
        i. a carrier having a vertical plate and a horizontal plate that defines a finger hole; and
        ii. bracket means joined to the carrier for guiding the battery on the carrier horizontal plate and for surrounding the carrier finger hole on one side of the carrier horizontal plate; and
    e. panel means assembled to the base for forming a vertical surface from the base with an opening therein in which the battery box slides and for cooperating with the base floor to cantilever support the battery box means in the open position,
        so that the battery box means is fully supported horizontally by the base floor and the panel means when the battery box means is in the open position.

2. The welding machine of claim 1 wherein the battery box means comprises:
   a. a carrier having a vertical plate and a horizontal plate that defines a finger hole proximate the vertical plate; and
   b. a bracket joined to the carrier, the bracket comprising:
      i. a channel section that guides the battery on the carrier; and
      ii. a housing section adjacent the bracket channel section that surrounds the finger hole.

3. The welding machine of claim 1 wherein the panel means comprises first and second panels assembled to the base, each panel having an outside leg, a middle leg, and an inside leg, the outside legs of the panels being coplanar and forming the vertical surface from the base, the middle legs of the panels defining the opening in the base vertical surface in which the battery box means slides between the open and closed positions thereof.

4. The welding machine of claim 3 wherein:
   a. the middle legs of the first and second panels are slightly shorter than the respective outside and inside legs; and
   b. the outside and inside legs of the panels are notched to cooperate with the middle legs and the base floor to define a horizontal slot on each side of the opening in the base vertical surface.

5. The welding machine of claim 3 wherein the battery box means comprises tab means for contacting the inside leg of at least one panel to prevent sliding the battery box means completely out of the opening in the base vertical surface.

6. The welding machine of claim 1 wherein:
   a. the panel means comprises first and second panels assembled to the base, each panel having an outside leg, a middle leg, and an inside leg, the outside legs of the panels being coplanar and forming the vertical surface from the base, the middle legs defining the opening in the base vertical surface;
   b. the outside, middle, and inside legs of the panels cooperate with the base floor to define horizontal slots on both sides of the opening in the base surface; and
   c. the carrier horizontal plate slides within the slots in the base vertical surface and is horizontally cantilever supported therein when the battery box means is in the open position.

7. The welding machine of claim 6 wherein the carrier horizontal plate is formed with at least one tab that contacts a panel when the battery box means is in the open position.

8. A method of providing access to a battery of an engine driven welding machine comprising the steps of:
   a. providing a base with a floor and a vertical surface with a opening therein;
   b. forming slots in the opening in the base vertical surface adjacent the base floor;
   c. securing the battery to a horizontal plate of a battery box;
   d. installing the battery box horizontal plate in the slots in the base opening;
   e. sliding the battery box out of the base opening to an open position and thereby exposing the battery;
   f. cantilever supporting the battery box horizontally in the slots in the base opening; and
   g. contacting the base with at least one tab on the battery box and thereby preventing the battery box from sliding completely out of the base opening.

* * * * *